May 13, 1969  E. L. HARTLEY  3,443,377
SELF-COOLED FUEL INJECTOR FOR A JET ENGINE
Filed Feb. 3, 1966
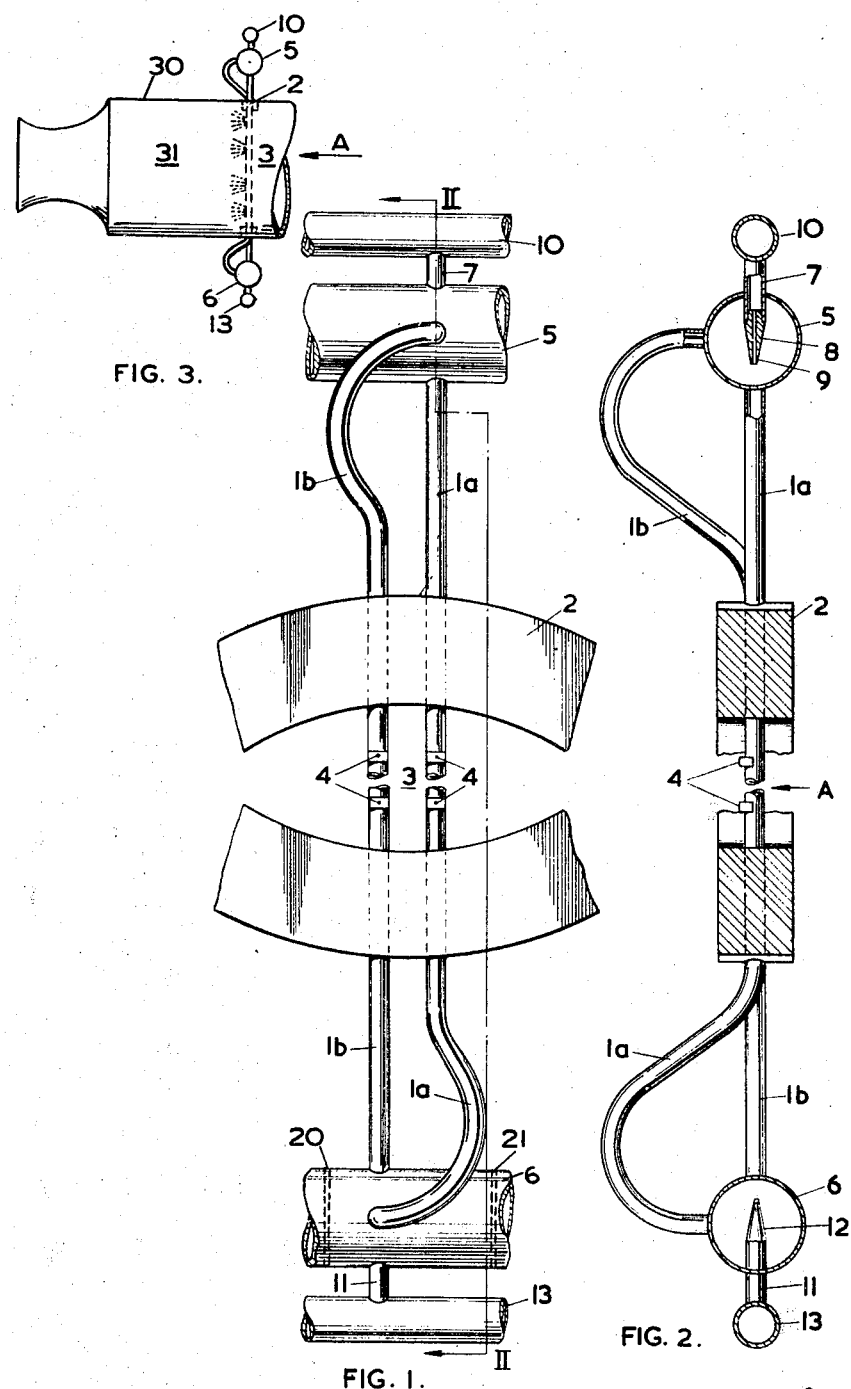
Edward Langford Hartley
Inventor
By
Stevens, Davis, Miller & Mosher   Attorneys United States Patent Office 3,443,377
Patented May 13, 1969

3,443,377
SELF-COOLED FUEL INJECTOR FOR A JET ENGINE
Edward Langford Hartley, Fleet, England, assignor to Power Jets (Research and Development) Limited, London, England
Filed Feb. 3, 1966, Ser. No. 524,679
Claims priority, application Great Britain, Feb. 8, 1965, 5,291/65
Int. Cl. F02g 3/00; F02k 7/08; B05b 15/00
U.S. Cl. 60—39.74                              5 Claims

ABSTRACT OF THE DISCLOSURE

A fuel injector comprising a series of pairs of tubes extending across a ramjet duct in the region of the combustion chamber inlet and having perforations in their downstream faces. The tubes extend between fuel headers carrying ejector nozzles. One nozzle is provided in each header for each pair of tubes, the nozzles being directed at the bores of different tubes and spaced from the tubes whereby the discharge of fuel under pressure from the nozzles will cause reduced pressure in the headers to draw fuel through the tubes in excess of that passing through the perforations, the said fuel being entrained by fresh fuel discharged by the nozzles.

---

The invention relates to fuel injectors such as might be used in ramjets.

At flight speeds of the order of Mach 6, air temperatures at the inlet to the combustion chamber of a ramjet using subsonic combustion (i.e. in which combustion takes place under subsonic flow conditions) can be as high as 1500° C. Satisfactory combustion performance can be achieved in a very short chamber length (of the order of half a diameter of the duct) using a fuel injector of the grid or matrix type giving about a 50 percent geometric blockage of the duct.

However some form of cooling is necessary to prevent burning of the grid and it is usual to provide water cooling, to pass an excess of fuel through the grid to carry heat away from it or to use a combination of the two. This involves a weight penalty resulting from the load of water required or from the heat exchangers which have hitherto been necessary to extract heat from the water or the fuel, according to the arrangement involved.

The invention is directed to the provision of a self-cooled fuel injector capable of functioning without external cooling means.

A fuel injector according to the invention comprises at least one pair of tubes having perforations from which fuel can be discharged and means for inducing circulation of a cooling medium through the tubes.

Preferably the fuel entering the injector for ultimate discharge therefrom constitutes the cooling medium and the circulation inducing means comprises ejector nozzles.

An embodiment of the invention will now be described by way of example with reference to the accompanying diagrammatic drawings, of which:

FIGURE 1 is a partial view of a fuel injector disposed across the duct of a ramjet as seen from downstream relative to the flow therethrough.

FIGURE 2 is a part sectional view of the fuel injector on the line II—II of FIGURE 1.

FIGURE 3 is an elevation of part of a ramjet with the injector of FIGURES 1 and 2 installed therein.

Referring to the drawings, a fuel injector comprises a series of parallel tubes 1a, 1b (of which one pair only is shown) carried in a support ring 2 and extending transversely across a passage 3, forming the duct of a ramjet 30, at a point adjacent to the air inlet to the combustion chamber 31 of the ramjet, which inlet and combustion chamber are in accordance with well-known practice. The support ring 2 forms a part of the boundary of the passage 3 the said boundary being otherwise constituted in the usual manner. The tubes 1a, 1b, which are provided with fuel injection holes 4 in their downstream faces, are arranged alternately in pairs and are connected to headers forming ejector boxes 5, 6 disposed respectively above and below the duct. The ends of each pair of tubes enter the ejector boxes on the same axial alignment but spaced apart circumferentially. Thus, the upper ends of tubes 1a enter the ejector box 5 at its under surface while the lower ends of the same tubes curve round to enter the ejector box 6 on the centre-line of its downstream face at points in line with where the lower ends of tubes 1b enter the same ejector box. Similarly the upper ends of tubes 1b curve round to enter the downstream face of ejector box 5 in line with the upper ends of tubes 1a.

Fuel supply pipes 7 pass through the upper surface of the ejector box 5 at points opposite to the upper ends of tubes 1a. Within the ejector box each pipe terminates in a tapered ejector nozzle 8 (FIGURE 2) having a discharge orifice 9 directed at the bore of the tube opposite. The said pipes are in turn connected to a fuel manifold 10. Fuel supply pipes 11 having ejector nozzles 12 likewise pass through the undersurface of ejector box 6 at points opposite to the lower ends of tubes 1b and are connected to a further fuel manifold 13.

In the foregoing embodiment, the ejector boxes are common to all the tubes forming the ejector. However, the headers may be subdivided to provide individual ejector box chambers for each pair of tubes, as by transverse partitions 20, 21 shown in dotted lines in ejector box 6 in FIGURE 1. Alternatively, a subdivision might embrace aa larger group of tubes.

In operation, gaseous fuel is supplied under pressure to the fuel manifolds thence passing via the fuel supply pipes to the discharge orifices of the ejector nozzles to be driven down the tubes of the injector. Fuel is sprayed out of the injection holes 4 to mix with air flowing in the direction of the arrow A (FIGURES 2 and 3) before being ignited in known manner in the ramjet combustion chamber. The tubes act as baffles and induce turbulence in the air flowing past them thus promoting flame stabilisation.

All the fuel entering the tubes will not initially pass through the injection holes and the system (i.e. tubes and ejector boxes) will thus become filled. The ejector nozzles in discharging further fuel have the effect of reducing the pressure within the ejector boxes and fuel therein is entrained with the incoming fuel to pass with it along the respective tubes. The amount of fuel flowing along the tubes will now be in excess of that required to pass through the injection holes and the surplus, or spill, will be drawn to the opposite ejector box by the reduced pressure existing there.

The air passing the tubes, having been heated by the effects of compression, raises their temperature very considerably irrespective of heat generated by the combustion process with the result that, without some form of cooling, their operational lives would tend to be extremely short due to burning.

The high specific heat of gaseous or vaporized fuels normally used in ramjets or similar devices enables these fuels to absorb considerable amounts of heat without adverse effect, but this is largely dependent on the length of time that the fuel remains in contact with a heated surface.

The fuel passing through the tubes absorbs heat from them and some fuel thereupon passes through the perforations in the tubes to the combustion chamber without having reached its absorption limit. Some of the heat absorbed by the spill fuel is passed to fresh fuel discharged by the ejector nozzles, thus raising its temperature, and further heat is absorbed before discharge of a part of the combined stream which thus contains a greater amount of heat than heretofore.

For a given tube geometry at given fuel and tube temperatures, the heat transfer from a tube to the fuel flowing through it can be expressed as a direct function of the mass flow, being otherwise independent of pressure and velocity. The instantaneous mass flow at any point obviously decreases as fuel passes out of the tube perforations which means that the cooling effect becomes progressively less towards the downstream end of a tube. However, at a given pressure, the secondary mass flow (i.e., downstream of the perforations) will be nearly constant and independent of the primary mass flow and, providing that stagnation does not occur, will be adequate to prevent local overheating. The considerable circulation of spill fuel around the system achieved by the ejector box and nozzle arrangement insures that such stagnation does not occur. Considerable latitude is available in this respect since, for a given primary mass flow, secondary mass flow can be significantly increased by an increase in fuel supply pressure, e.g., a 40% increase is obtainable with a pressure increase in the ratio of 3:4.

The heat capacity of the cryogenic fuel envisaged is such that it may first be used for other cooling purposes, such as parts of an associated aircraft, before entering the injector.

I claim:
1. A fuel injector comprising a pair of headers disposed in a spaced relationship, at least one pair of tubes extending between the headers, the tubes being arranged substantially parallel to one another and having perforations for the discharge of fuel; an individual ejector nozzle in each header for each pair of tubes, a nozzle in one header being directed into an open end of one tube of a pair, and a nozzle in the other header being directed into an open end of the other tube of said pair; and means for supplying fuel under pressure to the nozzles in excess of the amount that can be discharged from the perforations in the tubes, the nozzles being spaced from the open ends of the tubes and shaped and arranged so that the discharge of fuel from each nozzle to an associated tube will create a reduced pressure in the corresponding header, whereby the fuel directed into a tube of a given header and not passing through the perforations in said tube will be drawn to the opposite header and entrained by fuel discharged from the nozzle located in said opposite header.

2. A fuel injector according to claim 1, in which each header is subdivided to form a separate chamber for each pair of tubes, each chamber containing an ejector nozzle.

3. A fuel injector according to claim 2 further comprising manifolds connected to supply fuel to the ejector nozzles.

4. In combination, an airflow duct and a fuel injector having a pair of headers disposed in a spaced relationship, at least one pair of tubes extending between the headers and across the duct, the tubes being arranged substantially parallel to one another and having perforations from which the fuel may be discharged into the duct, an individual ejector nozzle in each header for each pair of tubes, a nozzle in one header being directed into an open end of one tube of a pair, and a nozzle in the other header being directed into an open end of the other tube of said pair; and means for supplying fuel under pressure to the nozzles in excess of the amount that can be discharged from the perforations in the tubes, the nozzles being spaced from the open ends of the tubes and shaped and arranged so that the discharge of fuel from each nozzle to an associated tube will create a reduced pressure in said header, whereby the fuel directed into a tube of a given header and not passing through the perforations in said tube will be drawn to the opposite header and entrained by fuel discharged from the nozzle located in the opposite header.

5. A combustion system according to claim 4 in which the perforations are formed in the downstream faces of the tubes relative to airflow along the duct.

References Cited

UNITED STATES PATENTS

| | | | |
|---|---|---|---|
| 2,520,388 | 8/1950 | Earl | 60—39.74 XR |
| 2,682,747 | 7/1954 | Ruegg. | |
| 2,690,648 | 10/1954 | Pearce et al. | 60—39.74 |
| 2,963,862 | 12/1960 | Jay | 60—39.74 |
| 3,043,104 | 7/1962 | Magnus | 60—39.66 XR |

JULIUS E. WEST, *Primary Examiner.*

U.S. Cl. X.R.

60—39.66, 243; 239—132.3